US008718667B2

(12) United States Patent
Song et al.

(10) Patent No.: US 8,718,667 B2
(45) Date of Patent: May 6, 2014

(54) ADAPTIVE RANDOM ACCESS CHANNEL RETRANSMISSION

(75) Inventors: Kee-Bong Song, Santa Clara, CA (US); Xiaowen Wang, Cupertino, CA (US); Syed A. Mujtaba, Santa Clara, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 13/555,083

(22) Filed: Jul. 21, 2012

(65) Prior Publication Data

US 2013/0035084 A1  Feb. 7, 2013

Related U.S. Application Data

(60) Provisional application No. 61/515,725, filed on Aug. 5, 2011.

(51) Int. Cl.
*H04W 74/00* (2009.01)
(52) U.S. Cl.
USPC .................. 455/455; 455/434; 370/252
(58) Field of Classification Search
USPC ................................. 455/455, 434
See application file for complete search history.

(56) References Cited

U.S. PATENT DOCUMENTS

| 7,013,146 | B2 | 3/2006 | Wang et al. | |
| 7,920,506 | B2 | 4/2011 | Kuroda et al. | |
| 2005/0213502 | A1* | 9/2005 | Convertino et al. | 370/229 |
| 2007/0115872 | A1 | 5/2007 | Kim et al. | |
| 2008/0056182 | A1* | 3/2008 | Usuda et al. | 370/329 |
| 2008/0259861 | A1 | 10/2008 | Kang et al. | |
| 2010/0097979 | A1 | 4/2010 | Shinozaki | |
| 2010/0128687 | A1 | 5/2010 | Oteri et al. | |
| 2010/0210243 | A1* | 8/2010 | Vujcic | 455/411 |
| 2010/0255847 | A1* | 10/2010 | Lee et al. | 455/436 |
| 2011/0051609 | A1* | 3/2011 | Ishii et al. | 370/252 |
| 2012/0033613 | A1* | 2/2012 | Lin et al. | 370/328 |

FOREIGN PATENT DOCUMENTS

| EP | 1892972 A1 | 2/2008 |
| EP | 2187696 A1 | 5/2010 |
| JP | 2007 266733 A | 10/2007 |

* cited by examiner

*Primary Examiner* — Charles Appiah
*Assistant Examiner* — Mazda Sabouri
(74) *Attorney, Agent, or Firm* — Fay Kaplun & Marcin, LLP

(57) ABSTRACT

A mobile wireless device adapts transmit power levels and number of retransmissions of a preamble sent to a wireless network. The mobile wireless device measures characteristics of a downlink signal received from the wireless network. The mobile wireless device transmits a series of preambles to the wireless network, each successive preamble having an increased power level, starting at a power level based on the measured received signal characteristics and on parameters received from the wireless network, up to a maximum transmit power level. When the transmit power level of the preamble exceeds the maximum transmit power level and when the measured downlink signal quality falls below a threshold, the mobile wireless device limits the number of preamble retransmission to less than an allowed maximum number of retransmissions. A minimum number of retransmissions is determined and adapted to higher values for larger measured values of downlink signal quality.

17 Claims, 7 Drawing Sheets

ADAPTIVE RANDOM ACCESS CHANNEL RETRANSMISSION

CROSS REFERENCE TO RELATED APPLICATIONS

This U.S. Patent Application claims priority under 35 U.S.C. 119(e) to U.S. Provisional Patent Application No. 61/515,725, filed Aug. 5, 2011 which is incorporated by reference in its entirety for all purposes.

TECHNICAL FIELD

The described embodiments generally relate to methods and apparatuses for adapting power levels of transmissions from mobile wireless devices. More particularly, the present embodiments describe method and apparatus for mobile wireless devices to adapt power levels and repetitions for uplink random access channel preamble transmissions depending on downlink channel conditions.

BACKGROUND

Mobile devices in wireless networks balance communication capabilities with limited power consumption, particularly in smaller form factors that offer advanced features such as "smart" phones. Analog transmissions can consume significant amounts of power that can affect battery drain in the mobile device. Wireless communication standards can specify procedures that can provide for lower power consumption under certain circumstances. Some of the specified procedures can be optional to implement, in which case judicious determination of when to use them (or to modify them) can result in improved power consumption while minimizing impact on communications performance.

The Third Generation Partnership Project (3GPP) communications standards organization develops successive releases of mobile communication standards including Global System for Mobile Communications (GSM), General Packet Radio Service (GPRS), Universal Mobile Telecommunications System (UMTS), Long Term Evolution (LTE) and LTE Advanced standards. The Third Generation (3G) wideband code division multiple access (WCDMA) UMTS wireless communications standard includes a shared uplink random access transport channel (RACH) on which a mobile wireless device transmits data to a wireless network. As the RACH uplink transport channel is shared among multiple mobile wireless devices, the mobile wireless device sends a request to originate a connection before a dedicated data channel is established. The mobile wireless device sends the request by transmitting a series of short preambles, each preamble with increasing power levels up to a maximum power level until receiving a response from the wireless network. When calculations indicate a requirement to send at high power levels relative to a maximum transmit power level for the mobile wireless device, the UMTS standard allows for early termination of the call origination request. Early termination of the request messaging under certain observed conditions can be used to conserve battery power in a mobile device but can also result in loss of a connection opportunity. A method to adapt transmission levels and repetitions for channel acquisition requests on a random access channel by a mobile wireless device can improve mobile originated call completion, such as in the presence of variable interference at a radio access subsystem receiving the channel acquisition requests in the wireless network.

SUMMARY OF THE DESCRIBED EMBODIMENTS

In one embodiment, a method of adapting power levels and repetitions of transmissions from mobile wireless devices to a wireless network is described. The method includes at least the following steps. In a first step, the mobile wireless device measures a downlink signal power level and downlink signal quality received from a radio access subsystem in the wireless network. In a second step, the mobile wireless device receives one or more transmit parameters from the radio access network that specify select downlink and uplink transmission characteristics. In a following step, the mobile wireless device calculates an initial transmit power level for an uplink preamble based on the transmit parameters received from the wireless network and on the measured downlink signal power level. The mobile wireless device transmits a series of preambles with increasing transmit power levels up to a maximum transmission power level. The number of retransmissions will not exceed a maximum transmission count. When receiving an ACK or NACK response from the wireless network, the mobile wireless device stops transmitting the preambles. When the preamble transmit power equals or exceeds a maximum transmit power level for the mobile wireless device and when the downlink signal quality simultaneously falls below a pre-determined threshold level, the mobile wireless device limits the number of preamble retransmissions to less than the maximum number of transmissions indicated by the maximum transmission count. The downlink signal quality received from the radio access subsystem is measured by the mobile wireless device using at least one of the following: a received signal code power (RSCP), a received signal strength indicator (RSSI) and a received signal to noise/interference ratio (Ec/Io).

In another embodiment, a mobile wireless device is described. The mobile wireless device includes an application processor and a transceiver. The application processor is configured to manage connections between the mobile wireless device and a wireless network. The transceiver is configured to measure a downlink signal power level and a downlink signal quality for a downlink signal received from a radio access subsystem in the wireless network. The transceiver is also configured to transmit a series of preambles to the radio access subsystem, each successive preamble having an increasing transmit power level and not exceeding a maximum transmit power level. The transceiver is further configured to limit the number of preamble transmissions based on the measured downlink signal quality to a minimum number of retransmission greater than zero and less than a maximum number of retransmissions when the transmit power level equals or exceeds the maximum transmit power level. The transceiver measures the downlink signal quality for the downlink signal received from the radio access subsystem using at least one of the following: a received signal code power (RSCP), a received signal strength indicator (RSSI) and a received signal to noise/interference ratio (Ec/Io).

Although described in terms of a W-CDMA UMTS network, the embodiments disclosed herein can be extended to other wireless networks as well.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
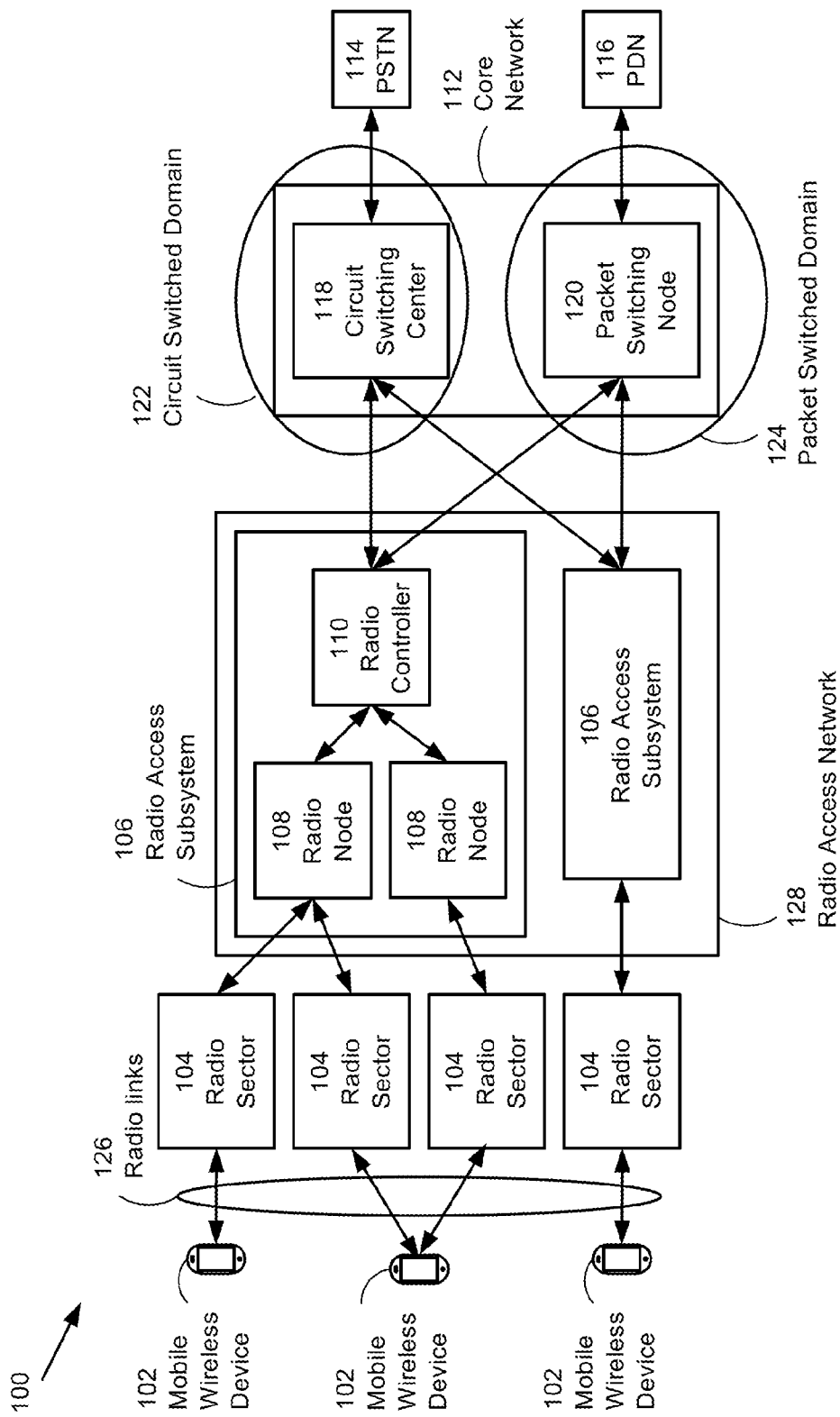
FIG. 1 illustrates components of a generic wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses for adapting power levels and repetitions of transmissions from a mobile wireless device to a wireless network, and in particular to adapting power levels and repetitions of uplink random access channel preamble transmissions sent to a random access network based on measured downlink channel conditions. In one embodiment, the uplink random access channel preamble transmissions are sent using a W-CDMA UMTS communications protocol. It should be understood, however, that other implementations of the same methods and apparatuses can apply to mobile wireless devices used in other types of wireless networks. For example, the same teachings could also be applied to an LTE or LTE-Advanced network other network using wireless communications with multiple retransmissions during channel acquisition. In general, the teachings described herein can apply to a mobile wireless device operating in a wireless network based on radio access technology that uses adaptive transmit power levels and repetitions during channel acquisition. The specific examples and implementations described herein are presented for simplicity in relation to W-CDMA UMTS networks can apply to other wireless network environments.

Providers of wireless mobile devices for advanced wireless networks seek to balance features for advanced communication capabilities, to provide responsive user interaction and to minimize power consumption available from limited battery storage, particularly in smaller form factors that offer multiple advanced features such as "smart" phones. Analog transmission and reception circuitry in a mobile wireless device can consume significant amounts of power that can affect battery drain in the mobile wireless device. Wireless communication standards can specify mandatory and optional procedures that can provide for lower power consumption under certain circumstances. As some of the specified procedures can be optional to implement, judicious determination of when to use them (or to modify them) can result in improved power consumption while minimizing impact on communications performance and responsiveness to user interaction.

In a W-CDMA UMTS wireless communications network, uplink communications from a mobile wireless device to the wireless network can use a shared communications link. In particular, a shared transport channel known as a random access channel (RACH) can provide uplink transport for signaling from the mobile wireless device, such as when initiating a mobile originated connection to the wireless network. Within a cell of the wireless network, multiple RACH can be simultaneously available, and the mobile wireless device can randomly select one of the multiple RACH to use. The mobile wireless device can receive specific information about the available RACH from the wireless network on a broadcast channel (BCH). The information provided can include a set of available sub-channels on the RACH and their scrambling codes and signatures. With this information the mobile wireless device can initiate an uplink transmission to the wireless network in order to secure access on the RACH to transmit an uplink message. Access to the RACH can be considered a form of a "slotted ALOHA" multiple access protocol that restricts when a mobile wireless device can initiate transmission to particular time slots. A preamble can be sent by the mobile wireless device during a randomly selected time slot at an initially calculated transmit power level. The initial transmit power level can depend on an estimate by the mobile wireless device of the signal attenuation path loss to a radio access subsystem in the wireless network and on dynamic and static performance and transmission parameters provided by the wireless network on the BCH. The parameters communicated by the wireless network can include uplink interference levels and constant power offset levels.

After sending a preamble on the RACH at an initial transmit power level, the mobile wireless device can wait for an acknowledgement from the wireless network on a separate acquisition indicator channel (AICH). When no acknowledgement is received by the mobile wireless device within certain time window after transmitting the preamble, the mobile wireless device can retransmit the preamble. The initial preamble can have been blocked by interference or can be attenuated sufficiently that the wireless network can be unable to detect or decode correctly the transmitted preamble. The mobile wireless device can increase the transmit power level of the preamble (and of each subsequent transmitted preamble) up to a maximum transmit power level. Repeated preamble transmissions can be attempted with increasing transmit power levels up to a maximum number of preamble re-transmissions. When the mobile wireless device is located farther from the radio access subsystem in the wireless network, e.g. geographically positioned near an outer edge of a cell, the preamble can be significantly attenuated during transmission to be difficult to detect by the wireless network. The transmit power required for the preamble to be received by the wireless network correctly under certain circumstances can exceed the maximum transmit power level allowed by the mobile wireless device, in particular the required transmit power level can be many dB above the maximum transmit power level permitted. In this case, repeated transmissions of the preamble by the mobile wireless device at the maximum transmit power level can increase random access collisions and contribute to interference in the cell. Each transmission at a maximum transmit power level can also drain battery power from the mobile wireless device. As such, the 3GPP UMTS mobile communications standard allows the mobile wireless device to terminate the repeated transmissions of the preamble before the maximum number of permissible re-transmissions is reached.

The mobile wireless device can prematurely exit the access procedure, and thus the mobile wireless device can terminate an attempt to originate a connection with the wireless network. Although this early termination can be beneficial for mobile wireless devices located at a significant distance from the radio access subsystem when correct reception of the preamble at the wireless network has a low probability, in some cases interference that can impede the correct reception of the preamble at the wireless network can be temporary. For example, when the mobile wireless device is located closer to the radio access subsystem in the wireless network, e.g. when signal attenuation is moderate, a lack of acknowledgement can indicate a high level of interference, which can change rapidly and not necessarily represent a persistent condition that precludes achieving a connection with the wireless network. Early termination of the RACH preamble re-transmission in this second case can result in a missed opportunity to complete a mobile originated connection. After the mobile wireless device terminates the preamble retransmission, the user can be required to re-initiate a requested connection to the wireless network by re-dialing, which can extend the time to complete a connection and lower the call connection success rate.

To increase the mobile originated call setup success rate, as well as to minimize power consumption by the mobile wireless device and to minimize excess radio frequency interference generated by higher transmit power transmissions from the mobile wireless device, methods and apparatus to adapt the transmit power levels and the repetitions of transmission of preambles during mobile originated call setup are described. When downlink received signal power and/or downlink received signal quality exceeds a first threshold level, the mobile wireless device can continue to send a preamble transmission on a random access channel (RACH) up to a maximum number of re-transmission attempts as allowed by the wireless network at an allowed transmit power level. The mobile wireless device can re-transmit the preamble when no acknowledgement is detected by the mobile wireless device, even when a calculated required transmit power level exceeds a maximum transmit power level for the mobile wireless device. In an embodiment, when downlink received signal power and/or downlink received signal quality exceeds a first threshold level, the mobile wireless device can send a preamble transmission on a random access channel (RACH) with a maximum number of re-transmission attempts as allowed by the wireless network at an allowed transmit power level, even if a calculated required transmit power level exceeds a maximum transmit power level for the mobile wireless device. In another embodiment, downlink signal conditions can be measured by the mobile wireless device using at least one of a received signal code power (RSCP), a received signal strength indicator (RSSI) and a received signal to noise/interference ratio (Ec/Io). When downlink signal conditions measured at the mobile wireless device do not exceed the first threshold level, the mobile wireless device can allow a minimum number of re-transmission attempts that is less than the maximum number of re-transmission attempts allowed by the wireless network. The minimum number of re-transmission attempts can be determined adaptively based on the measured downlink signal conditions and/or based on the difference between the calculated required transmit power level and the maximum transmit power level for the mobile wireless device. In one embodiment, higher amounts of excess transmit power required compared with the maximum transmit power level allowed for the mobile wireless device can decrease the number of re-transmission attempts by the mobile wireless device. Continuing re-transmission attempts under high busty uplink interference but otherwise good signal propagation conditions can provide an opportunity to complete a requested call connection by the mobile wireless device without restarting the call connection process. Limiting the number of retransmission attempts to less than a maximum number of retransmission attempts permitted can minimize power consumption by the mobile wireless device and minimize transmitted interference levels caused by the mobile wireless device in the wireless network.

These and other embodiments are discussed below with reference to FIGS. 1-7. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128. The radio frequency spectrum used by the radio links 126 in each radio sector 104 can be shared among multiple mobile wireless devices 102 simultaneously. Methods to share the radio frequency spectrum can include time division, frequency division, code division, spatial division and combinations thereof.

The radio access network 128, which provides radio frequency connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
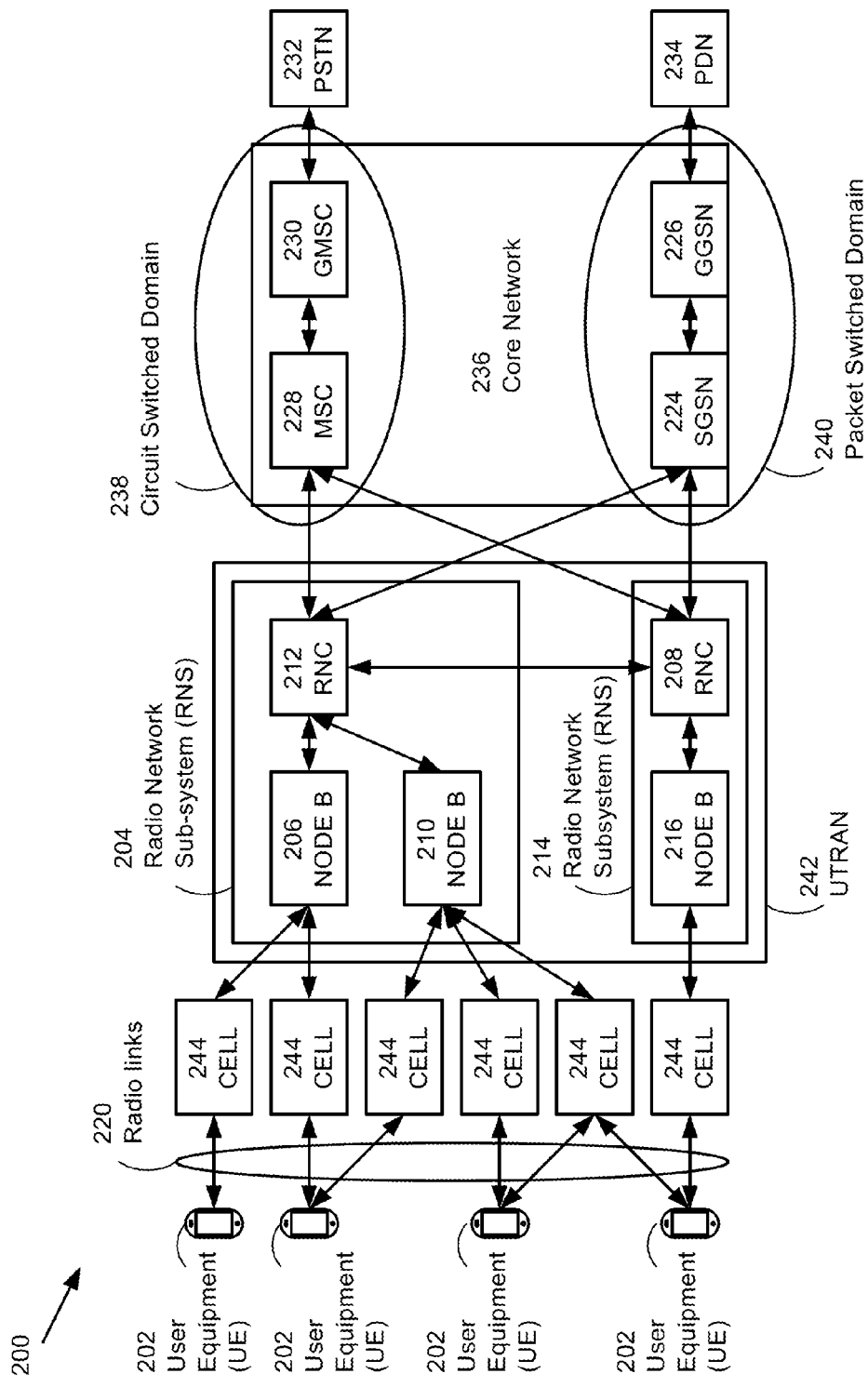
FIG. 2 illustrates components of a UMTS wireless communication network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services. For example, a general voice conversation can be transported through a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
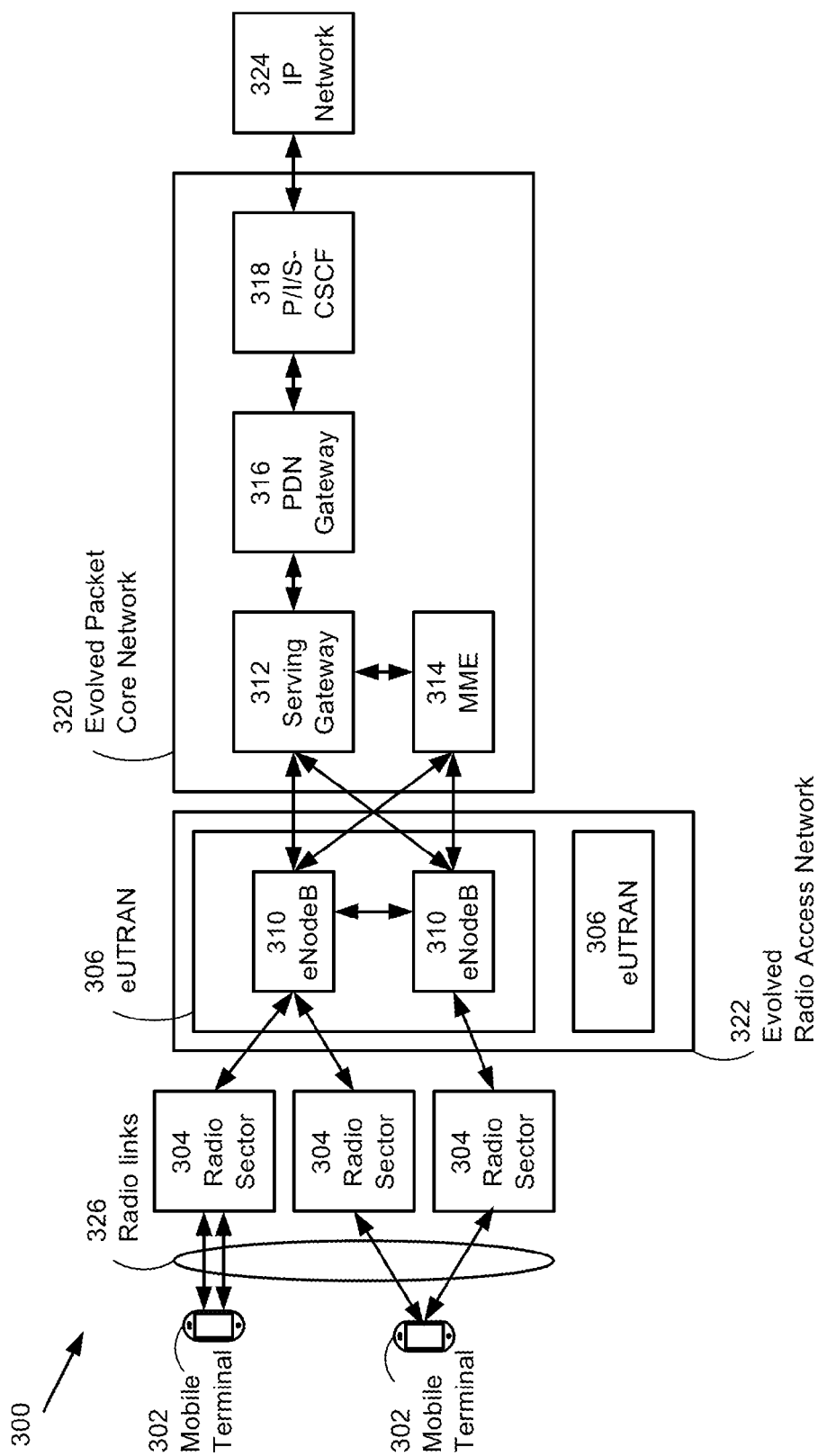
FIG. 3 illustrates components of a LTE wireless communication network.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both the transmitting and receiving base stations (such as the Node B 206 in the UMTS network 200) as well as the base station radio controllers (such as the RNC 212 in the UMTS network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an evolved UTRAN (eUTRAN) 306. The eNodeB 310 can also be connected to a mobility management entity (MME) 314 that can provide control over connections for the mobile terminal 302.

Figure 4:
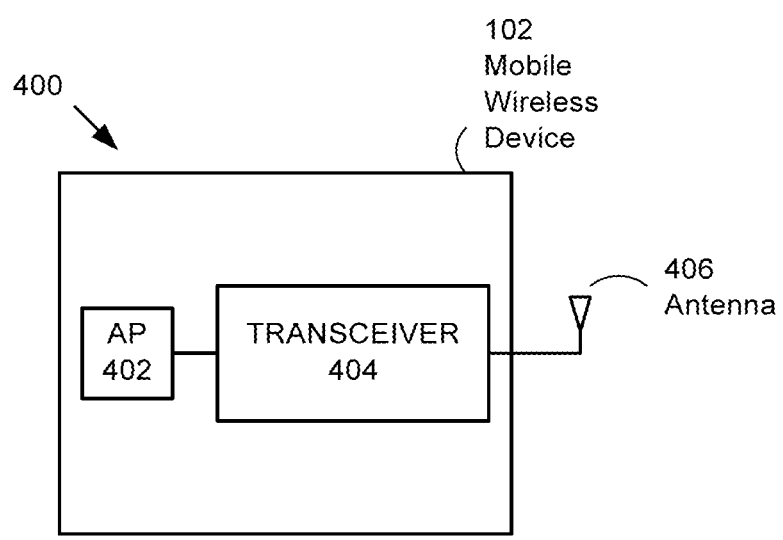
FIG. 4 illustrates a representative architecture for a mobile wireless device.

FIG. 4 illustrates select processing elements in a mobile wireless device 102. A mobile wireless device 102 can include a transceiver 404 that can process signals for reception and transmission through an antenna 406 (or multiple antennas) according to a wireless communication protocol used by a wireless network 100. The transceiver 404 can be primarily used for lower layer transmission protocols, such as a physical layer 1 radio frequency communication protocol. The transceiver 404 can be connected to an application processor (AP) 402 that can provide higher layer functions, such requesting establishment and release of connections for various resident application services. The transceiver 404 can provide the lower layer functions that can support the transport of data for the higher layer services ordered by the application processor 402. The use of multiple antennas (not shown) for certain wireless communication protocols can provide improved performance (e.g. higher data rates or better immunity to interference) compared to a single antenna configuration. For example, a multiple input multiple output (MIMO) scheme can be used for a mobile terminal 402 connected to the LTE network 400.

Figure 5:
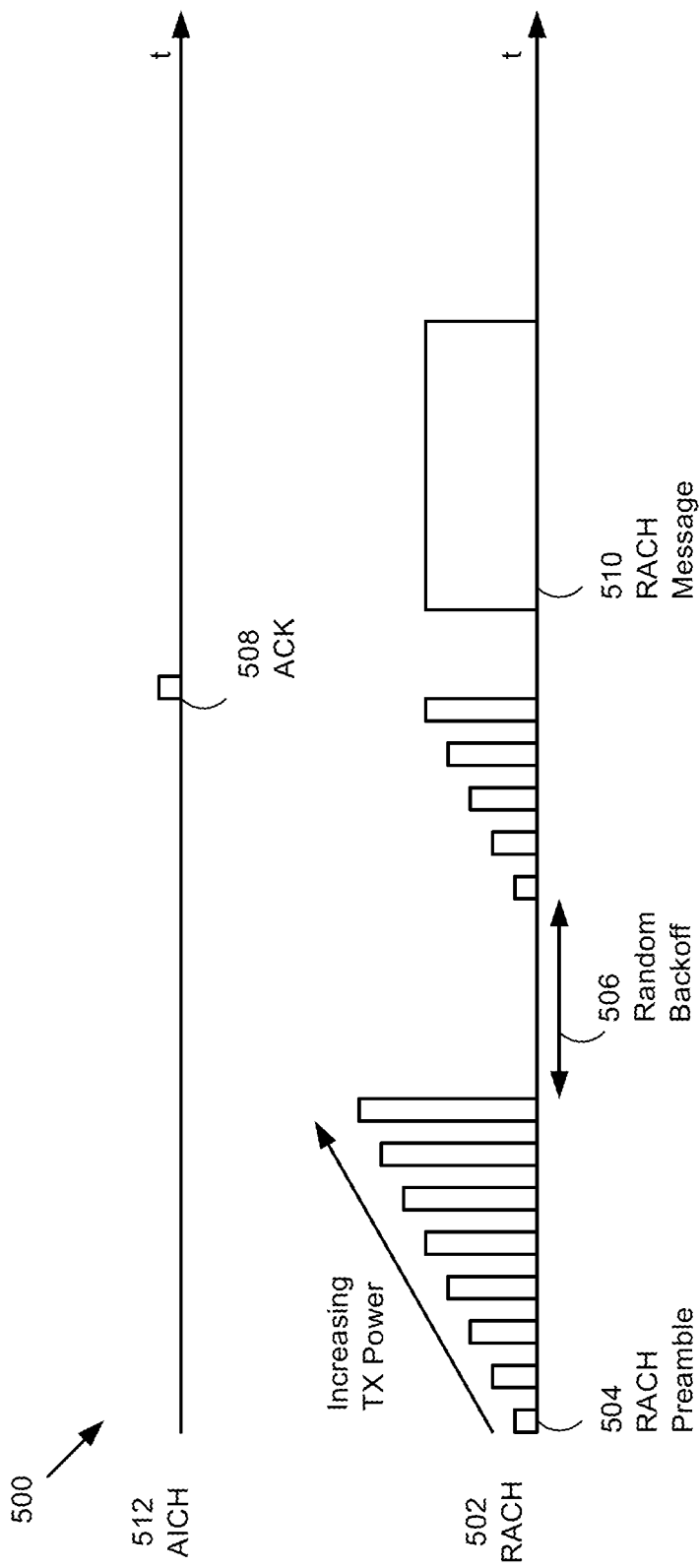
FIG. 5 illustrates a series of transmissions on a random access channel (RACH) and reception on an acquisition indicator channel (AICH) by a mobile wireless device in the UMTS wireless communication network.

FIG. 5 illustrates a random access channel (RACH) acquisition procedure 500 with increasing transmit power levels for a RACH preamble 504 sent from a mobile wireless device 102 to a radio access subsystem 106 in a wireless network 100. Because the wireless network can receive transmissions on the RACH 502 from multiple mobile wireless devices 102 in a common radio sector 104 (cell) of the wireless network 100, a collision between multiple mobile wireless devices 102 can occur. To receive an allocation for a time slot for transmission in the uplink direction to the wireless network 100, the mobile wireless device 102 can first send a RACH preamble 504 in a randomly selected time slot from a set of RACH 502 available. The wireless network 100 can indicate to the mobile wireless device 102 the set of available RACH 502 on a broadcast channel (BCH) to which all of the mobile wireless devices 102 in the radio sector 104 can listen. The radio access subsystem 106 can also broadcast an appropriate set of scrambling codes and signatures that the mobile wireless device 102 can use on the RACH 502.

The mobile wireless device 102 can measure a downlink signal power level received from the radio access subsystem 106. In conjunction with system information provided by the radio access subsystem 106, the mobile wireless device 102 can calculate an initial transmit power level to use for the RACH preamble 504. In one embodiment, the initial transmit power level for the RACH preamble can be calculated as an estimated path loss plus an uplink interference amount provided by the wireless network plus a constant offset value also specified by the wireless network. The path loss can be estimated by the mobile wireless device 102 by calculating a difference between a common pilot channel (CPICH) transmit power level (which can be learned from the radio access subsystem 106 in the wireless network 100 through messages sent on the BCH) and the measured CPICH received signal code power (RSCP). A level of interference present at the radio access subsystem 106 in the wireless network 100 can also be broadcast at regular intervals by the radio access subsystem 106 in system information blocks (SIBs) transmitted on the BCH, as can the constant offset value.

When neither a positive acknowledgement (ACK) nor a negative acknowledgement (NACK) is received by the mobile wireless device 102 from the wireless network 100 in response to the previously transmitted RACH preamble 504, the mobile wireless device 102 can retransmit the RACH preamble 504. Acknowledgements can be sent by the wireless network 100 on an acquisition indicator channel (RICH) 512. At each re-transmission, the mobile wireless device 102 can increase the transmit power level of the RACH preamble 504 by a power ramp increment (step) that can be specified by the wireless network 100 (and also signaled in a SIB on the BCH). A representative value for the power increment can be 1 dB. With increasing transmit power levels, the RACH preamble 504 can overcome greater attenuation (path loss) and/or increased interference levels present at the receiving end of the radio access link in the radio access subsystem 106 of the wireless network 100. The RACH preamble 504 can be re-transmitted multiple times, up to a maximum number of re-transmissions that can be specified by the wireless network 100. A representative maximum number of re-transmissions can be a value of 8. With an increment of 1 dB in transmit power level per re-transmission, the final RACH preamble 504 transmission can be as much as 7 dB above the initial RACH preamble 504 transmit level. The mobile wireless device 102 can also impose a maximum transmit power level for the RACH preamble 504 that can cap the transmitted power level to avoid overdriving the analog transmission circuitry in the mobile wireless device 102 and limit interference levels in the radio access portion of the wireless network 100. Similarly the wireless network 102 can specify that when the required transmit power level of the RACH preamble 504 exceeds a delta value (typically 6 dB) above the maximum allowed transmit power level indicated by the wireless network 100, the series of RACH preamble 504 transmissions can be terminated. Early termination of the preamble retransmissions can save battery power drain from the mobile wireless device 102, as well as reduce unnecessary interference in the wireless network 100 that can result from multiple unsuccessful access attempts on the RACH 502.

If no successful acknowledgement is received during a first series of RACH preambles 504, the mobile wireless device can wait a random "back-off" time period 506 and retry the RACH preamble transmission series again. As shown in FIG. 5, after receiving a positive acknowledgement (ACK 508) on the downlink AICH 512, the mobile wireless device 102 can stop sending the preambles and send an uplink RACH message 510 at a transmit power level comparable to the power level used for the last transmitted RACH preamble 504 to which the ACK 508 was received. In some embodiments, the transmit power level of the RACH message 510 can be adjusted to a different level than the last transmitted RACH preamble 504 transmit power level by a power offset value communicated by the wireless network 100 on the BCH.

The option to terminate the RACH preamble transmission series early can provide for reduced power consumption by the mobile wireless device 102 and reduced interference generation in the mobile wireless network 100 at the expense of a missed connection opportunity for the mobile wireless device 102. With early termination the layer 1 processing block in the mobile wireless device 102 (typically the transceiver 404) can indicate a lack of acknowledgement ("No ACK") received from the wireless network 100 to the higher layer processing block (typically the AP 402). A user can then be required to "re-dial" to re-attempt to form a connection with the wireless network 100. In certain circumstances, such as when a temporary higher interference level exists at the receiving radio access subsystem 106 in the wireless network 100, continued attempts to send the RACH preamble 504 can have a likely probability of success without requiring a restart of the entire connection process. Downlink signal conditions measured at the mobile wireless device 102 can be used to surmise certain properties of uplink signal conditions that can exist at the radio access subsystem 106 in the wireless network 100. In particular, when downlink signal conditions are "good", as measured for example by at least one of a received signal power level, a received signal quality and a received signal code power to interference ratio (i.e. effectively a measure of SNR), the mobile wireless device 102 can continue to send the RACH preamble 504 up to the maximum number of re-transmission attempts allowed by the network at the allowed transmit levels, even if the commanded transmit power level exceeds the maximum transmit power level for the mobile wireless device 102.

When downlink signal conditions are "poor", the number of re-transmissions by the mobile wireless device 102 can be reduced below the maximum number of re-transmissions permissible but can avoid ending the preamble retransmissions prematurely. A minimum number of re-transmissions can be calculated by the mobile wireless device 102 adaptively based on the measured downlink signal conditions and/or based on the difference between the required transmit power level and the maximum transmit power level for the mobile wireless device 102. In a representative embodiment, for weak measured downlink signal conditions (e.g. received signal strength indicator RSSI=−100 dBm) the mobile wireless device can reduce the number of re-transmissions to less than a maximum (e.g. <8) when the required transmit power level equals or exceeds the maximum transmit power level of the mobile wireless device 102. With greater values of required transmit power level above the maximum transmit power level, the number of re-transmissions can be further reduced.

Figure 6:
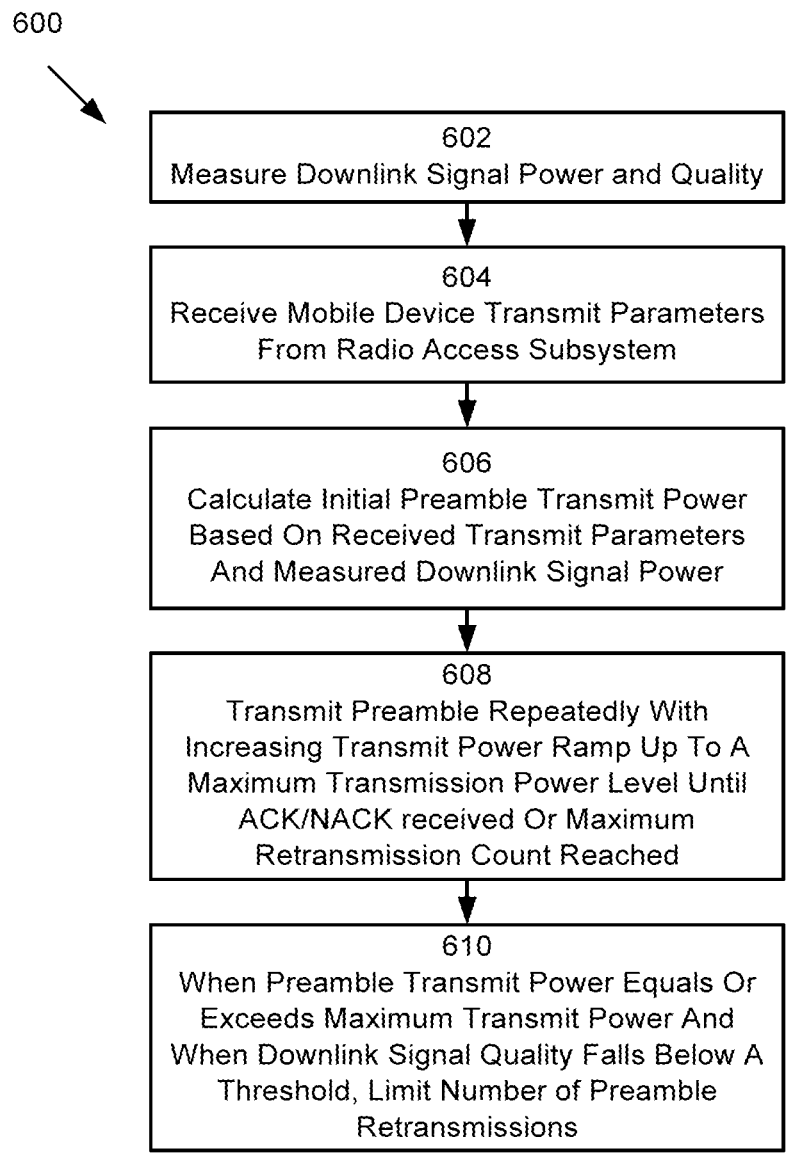
FIG. 6 illustrates a method for the mobile wireless device to adapt transmit power levels for a series of preamble transmissions to a wireless network.

FIG. 6 illustrates a representative method 600 to adapt transmit power levels and repetitions for an uplink preamble sent by the mobile wireless device 102 to the wireless network 100. In step 602, the mobile wireless device 102 can measure a downlink signal power and a downlink signal quality received from the radio access subsystem 106 in the wireless network 100. In an embodiment, a measured receive signal code power (RSCP) can provide an indication of the signal path attenuation loss incurred for transmissions from the radio access subsystem 106 to the mobile wireless device 102. The uplink signal path attenuation for signals transmitted at an uplink radio frequency can differ from the downlink signal path attenuation; however, the measured downlink signal path attenuation can provide an approximate measure of the relative distance between the mobile wireless device 102 and the transmitting radio access subsystem 106 in the wireless network 100. The downlink signal path attenuation can provide an indirect measure of the uplink signal path attenuation. In step 604, the mobile wireless device 102 can receive transmit parameters broadcast by the radio access subsystem 106 in the wireless network 100. The parameters received by the mobile wireless device 102 can include one or more values for downlink transmit signal power, uplink interference levels, offset values and retransmission parameters. In step 606, the mobile wireless device 102 can calculate an initial preamble transmit power level based on the received transmit parameters and the measured downlink signal power. In an embodiment, the mobile wireless device 102 can estimate a downlink path attenuation for signals received from the radio access subsystem 106 in the wireless network 100.

In step 608, the mobile wireless device 102 can transmit the preamble repeatedly at regular intervals with increasing transmit power levels up to a maximum transmission power level until a positive acknowledgement (ACK) or negative acknowledgement (NACK) is received from the radio access subsystem 106 in the wireless network 100 or until a maximum re-transmission count is reached. In step 610, the mobile wireless device 102 can limit the number of preamble re-transmissions when the preamble transmit power equals or exceeds a maximum transmit power level and the measured downlink signal quality falls below a pre-determined threshold. In an embodiment, the more the requested preamble transmit power level exceeds the maximum transmit power level, the more the number of preamble re-transmissions can be limited (e.g., made less than a default number). When the downlink signal quality exceeds the pre-determined threshold, the mobile wireless device 102 can infer that the uplink signal quality can also be high assuming no persistent uplink interference exists at the receiving radio access subsystem 106 in the wireless network 100. While the wireless network 100 can indicate in an earlier broadcast message a relatively high level of uplink interference, the interference level can vary substantially over time, and for a mobile wireless device 102 located relatively close to the radio access subsystem 106 in the wireless network 100, continued attempts at re-transmission can have a reasonable probability of success. By continuing the re-transmissions at least a few times (even if not for the full amount of allowed re-transmissions), the mobile wireless device 102 can attempt to complete a connection with the wireless network 100, rather than requiring the user to re-attempt the connection by re-initiating a connection request. When the downlink signal quality measured at the mobile wireless device 102 is poor, such as when the mobile wireless device 102 is located at an increased distance from the radio access subsystem 106 in the wireless network 100, the resulting uplink signal attenuation that can impede reception of the preamble at the radio access subsystem 106 of the wireless network can change only slowly, and numerous repeated re-transmission attempts can waste battery power and unnecessarily increase interference in the radio sector 104 of the wireless network. Thus, it can be preferred to limit the number of re-transmissions to less than the maximum number of allowable re-transmissions when the measured downlink signal quality is relatively low.

Figure 7:
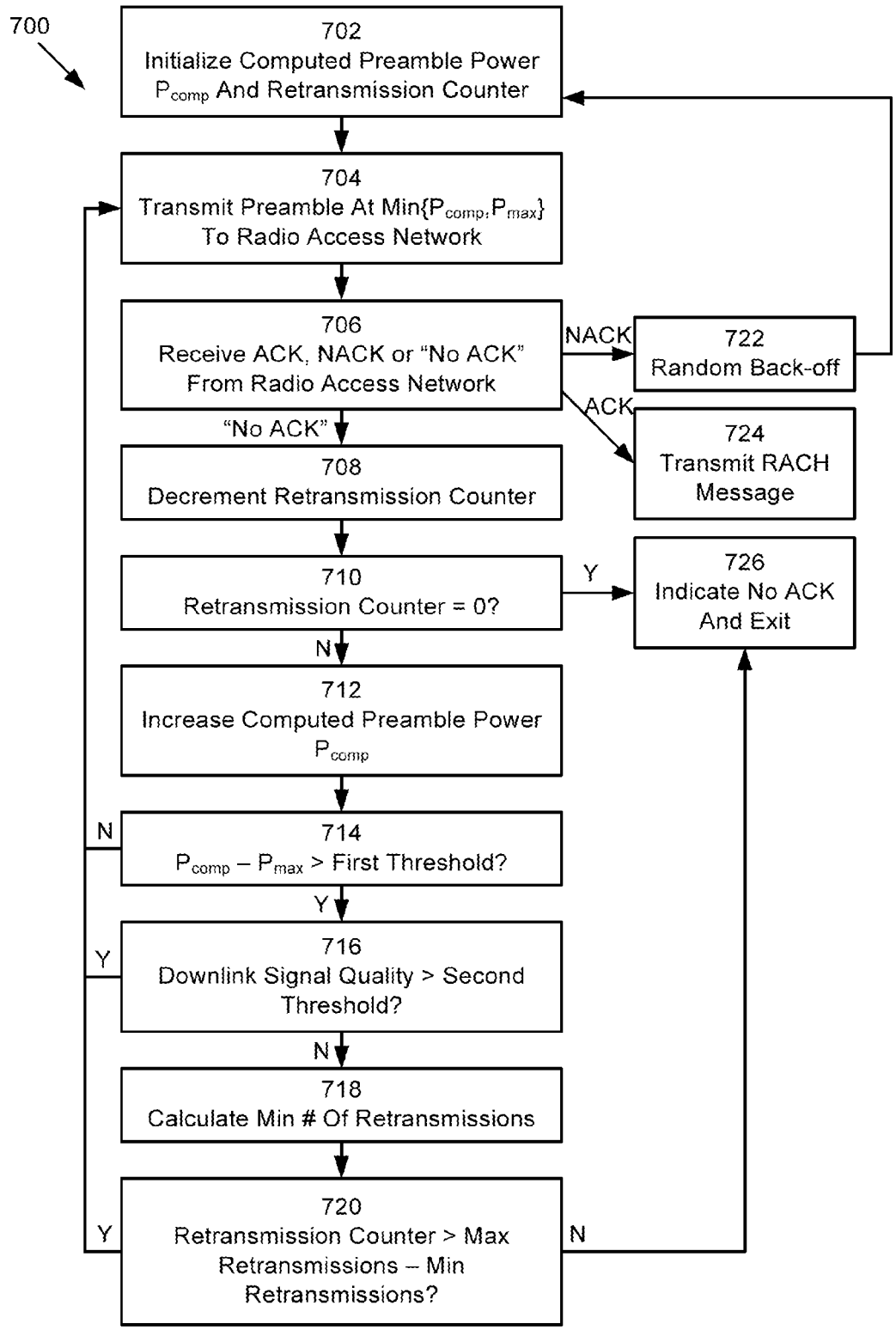
FIG. 7 illustrates another method for the mobile wireless device to adapt transmit power levels for a series of preamble transmissions to a wireless network.

FIG. 7 illustrates another embodiment of a method 700 to adapt transmit power levels and number of re-transmissions of a preamble by the mobile wireless device 102 communicating to the radio access subsystem 106 in the wireless network 100. In step 702, the mobile wireless device 102 can initialize a computed preamble transmit power level $P_{comp}$ to an initial value. The initial value for $P_{comp}$ can be determined based on one or more parameters received from the wireless network 100 over a broadcast channel (BCH) and on one or more receive signal parameters measured at the mobile wireless device 102. The initial value for the re-transmission counter can also be determined based on a parameters received from the wireless network 100 broadcast over the BCH. In step 704, the mobile wireless device 102 can transmit the preamble at a transmit power level that is the minimum of the computed preamble transmit power level $P_{comp}$ and a maximum transmit power level $P_{max}$ for the mobile wireless device. The maximum transmit power level $P_{max}$ can be set by the wireless network or by the capabilities of the mobile wireless device 102 or a combination of both limitations. The preamble can be transmitted by the mobile wireless device 102 to a radio access subsystem 106 in a radio access network 128 portion of the wireless network 100. In step 706, the mobile wireless device 102 can listen for an acknowledgement (ACK) or negative acknowledgement (NACK) on a parallel acquisition indicator channel, e.g. the AICH. When an ACK is received from the wireless network 100, the mobile wireless device 102 can transmit a RACH message as indicated in step 724. The transmit power level of the RACH message can be related to the transmit power level of the last RACH preamble sent before receipt of the ACK from the wireless network 100.

When no acknowledgement ("No ACK") is received by the mobile wireless device 102 from the wireless network 100, in step 708, the mobile wireless device 102 can decrement the re-transmission counter. In step 710, the mobile wireless device 102 can determine if the number of re-transmission has reached zero, i.e. the maximum number of re-transmissions has been reached, and if so, the mobile wireless device 102 can indicate no acknowledgement, in step 726, and exit the method. The "No ACK" can be communicated between a lower layer (e.g. physical layer 1) processing block to a higher layer processing block in the mobile wireless device 102. In an embodiment, the lower layer processing block can be the transceiver 404, while the higher layer processing block can be the application processor (AP) 402. In other embodiments, the lower layer and higher layer processing blocks can be contained in one processing element of the mobile wireless device 102. When the re-transmission counter has not reached zero, the method 700 can continue.

In step 712, the mobile wireless device 102 can increase the preamble transmit power level $P_{comp}$ by a pre-determined increment, e.g. by a value broadcast by the wireless network 100 in the BCH. The computed transmit power level of the preamble $P_{comp}$ can be increased to provide a greater probability that the transmit preamble can be received correctly by the radio access subsystem 106 in the wireless network 100. The computed transmit power level $P_{comp}$ can be greater than the maximum transmit power level $P_{max}$, which can provide an indication of how much excess power appears to be required to communicate the preamble to the wireless network 102. In step 714, the difference between the increased computed transmit power level $P_{comp}$ and the maximum transmit power level $P_{max}$ can be compared to a first threshold. When the computed transmit power level $P_{comp}$ does not exceed the maximum transmit power level $P_{max}$ by more than the first threshold value, the mobile wireless device can return to step 704 to re-transmit the preamble. The preamble can then be retransmitted at a higher power level than used in the preceding transmission, although the computed transmit power level $P_{comp}$ can be transmitted only at or below the maximum transmit power level $P_{max}$. When the computed transmit power level $P_{comp}$ exceeds the maximum transmit power level $P_{max}$ by the first threshold, as determined in step 714, the mobile wireless device 102 can compare a measured downlink signal quality received at the mobile wireless device 102 to a second pre-determined threshold. If the measured downlink signal quality exceeds the second threshold, then the mobile wireless device 102 can return to re-transmitting the preamble in step 704. By exceeding the second threshold, the measured downlink signal quality can provide an indirect indication that the uplink preamble signal power that can be received at the radio access subsystem 106 in the radio access network 128 portion of the wireless network 100 can be sufficiently high to warrant continuing re-transmissions, even when the computed transmit power level $P_{comp}$ can exceed the maximum transmit power level $P_{max}$ by more than the first threshold.

When the measured downlink signal quality does not exceed the second threshold in step 716, then in step 718 the mobile wireless device 102 can calculate a minimum number of re-transmissions. This minimum number of re-transmission can be less than the maximum number of retransmissions but larger than zero. The minimum number of retransmissions can depend on measured downlink signal conditions, including at least one of the received signal code power (RSCP), the receive signal strength indicator (RSSI) and the received signal code power to noise/interference ratio (Ec/Io). The minimum number of retransmissions can also depend on the difference between the computed preamble transmit power level $P_{comp}$ and the maximum transmit power level $P_{max}$. In general, the more the computed preamble transmit power level $P_{comp}$ exceeds the maximum transmit power level $P_{max}$ the fewer re-transmissions can be warranted when the downlink signal quality is below the second threshold. When the minimum number of retransmissions is greater than zero, at least that number of retransmission of the preamble can be attempted. When the minimum number of retransmissions is lower than the maximum number of retransmissions, the retransmission attempts can end sooner to conserve battery drain, reduce thermals and reduce unnecessary interference in the network.

In a representative embodiment, the minimum number of retransmissions can be set to one when the computed preamble transmit power level $P_{comp}$ exceeds the maximum transmit power level $P_{max}$ by 6 dB or more. This minimum retransmission value of one can provide for at least one re-transmission attempt, in contrast to the optional algorithm outlined in the 3GPP 25.214 communication standard which would terminate the preamble without any retransmissions. In a representative embodiment, the minimum number of retransmissions can be set to more than one when the computed preamble transmit power level $P_{comp}$ does not exceed the maximum transmit power level $P_{max}$ by 6 dB, in which case at least two retransmission attempts can follow.

In step 720, the mobile wireless device 102 can compare the current re-transmission counter value to a difference between the maximum number of re-transmissions allowed and the calculated minimum number of re-transmissions. When the retransmission counter falls below the difference between the maximum number of re-transmissions allowed and the calculated minimum number of re-transmissions, the lower layer processing block in the mobile wireless device 102 can indicate to the higher layer processing block a lack of acknowledgement receipt ("No ACK") and exit the method. When the retransmission counter does not fall below the difference between the maximum number of re-transmissions allowed and the calculated minimum number of re-transmissions, the mobile wireless device 102 can proceed to retransmit the preamble to the radio access subsystem 106 in the radio access network 128 portion of the wireless network 100. If the downlink signal quality remains below the second threshold, then as the mobile wireless device 102 repeats the retransmission and the series of steps that follow, and with no acknowledgement, the computed preamble transmit power $P_{comp}$ can continue to increase, the retransmission counter can decrement and the calculated minimum number of retransmissions can decrease, eventually causing the retransmission attempts to cease. The method described herein allows for a limited number of retransmission attempts that can be adaptively adjusted based on measured signal quality conditions and on thresholds set at the mobile wireless device. The limited number of retransmission attempts can be less than the maximum number of retransmission attempts allowed and can also be more than the zero number permitted (but not required) by the 3GPP wireless communication standard.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of adapting transmit power levels and repetitions of transmissions from a mobile wireless device to a wireless network, the method comprising:
at the mobile wireless device:
measuring a downlink signal power level and a downlink signal quality received from a radio access subsystem in the wireless network;
receiving one or more transmit parameters from the radio access subsystem;
calculating an initial transmit power level for an uplink preamble based on the received transmit parameters and on the measured downlink signal power level;
transmitting a series of preambles to the radio access subsystem, each successive preamble having an increasing transmit power level up to and not exceeding a maximum transmit power level, and a number of retransmissions not exceeding a maximum retransmission count;
stop transmitting the preamble retransmissions after receiving an ACK or NACK response from the radio access subsystem;
when the transmit power level of the preamble equals or exceeds the maximum transmit power level and the measured downlink signal quality falls below a pre-determined threshold, limiting the number of preamble retransmissions to less than the maximum retransmission count; and
when the measured downlink signal quality falls below the pre-determined threshold, calculating a minimum number of preamble retransmissions that is less than the maximum number of retransmission count allowed by the wireless network but larger than zero, wherein the minimum number of preamble retransmissions depends on an excess amount between a computed preamble transmit power level and the maximum transmit power level, wherein a higher excess amount decreases the minimum number of preamble retransmissions.

2. The method of claim 1, wherein the downlink signal quality received from the radio access subsystem is measured by the mobile wireless device using at least one of a received signal code power (RSCP), a received signal strength indicator (RSSI) and a received signal to noise/interference ratio (Ec/Io).

3. The method of claim 1, wherein the minimum number of preamble retransmissions further depends on measured downlink signal conditions, comprising at least one of the received signal code power (RSCP), the received signal strength indicator (RSSI) and the received signal code power to noise/interference ratio (Ec/Io).

4. The method of claim 1, wherein the minimum number of preamble retransmissions is set to one when the computed preamble transmit power exceeds the maximum transmit power level by 6 dB or more.

5. The method of claim 1, wherein uplink communication from the mobile wireless device to the wireless network uses a shared communications link.

6. The method of claim 5, wherein the shared communications link uses a random access channel (RACH) to provide uplink communication from the mobile wireless device to the wireless network.

7. The method of claim 6, wherein the ACK or NACK response is received on a separate acquisition indicator channel (AICH).

8. The method of claim 1, wherein the initial transmit power level for the uplink preamble is calculated as an estimated path loss plus an uplink interference amount and a constant offset value provided by the wireless network.

9. The method of claim 8, wherein the path loss is estimated by the mobile wireless device by calculating a difference between a common pilot channel (CPICH) transmit power level and a measured CPICH received signal code power (RSCP).

10. The method of claim 9, wherein the uplink interference amount and the constant offset value are broadcast at regular intervals by the radio access subsystem in system information blocks (SIBs) transmitted on a broadcast channel (BCH).

11. The method of claim 10, wherein the measured received signal code power (RSCP) provides an indication of a signal path attenuation loss incurred for transmissions from the radio access subsystem to the mobile wireless device.

12. The method of claim 1, wherein the wireless network is an UMTS, LTE or LTE-Advanced wireless network.

13. The method of claim 1, wherein the one or more transmit parameters received from the radio access subsystem include one or more values for downlink transmit signal power, uplink interference levels, offset values and retransmission parameters.

14. A mobile wireless device comprising:
an application processor configured to manage connections between the mobile wireless device and a wireless network; and
a transceiver configured to:
    measure a downlink signal power level and a downlink signal quality for a downlink signal received from a radio access subsystem in the wireless network;
    transmit a series of preambles to the radio access subsystem, each successive preamble having an increasing transmit power level and not exceeding a maximum transmit power level; and
    limit the number of preamble retransmissions based on the measured downlink signal quality to a minimum number of retransmissions greater than zero and less than a maximum number of retransmissions when the transmit power level equals or exceeds the maximum transmit power level, wherein the minimum number of retransmissions further depends on an excess amount between a computed preamble transmit power level and the maximum transmit power level, wherein a higher excess amount decreases the minimum number of retransmissions.

15. The device of claim 14, wherein the transceiver measures the downlink signal quality for the downlink signal received from the radio access subsystem using at least one of a received signal code power (RSCP), a received signal strength indicator (RSSI) and a received signal to noise/interference ratio (Ec/Io).

16. The device of claim 15, wherein the minimum number of retransmissions depends on measured downlink signal conditions, comprising at least one of the received signal code power (RSCP), the received signal strength indicator (RSSI) and the received signal code power to noise/interference ratio (Ec/Io).

17. The device of claim 14, wherein the minimum number of retransmissions is set to one when the computed preamble transmit power exceeds the maximum transmit power level by 6 dB or more.

* * * * *